Oct. 21, 1958  J. HIMKA ET AL  2,857,198
DOOR ACTUATED ROOF CLOSURE FOR VEHICLE SIDE DOOR OPENING
Filed Jan. 18, 1956  3 Sheets-Sheet 1

INVENTORS
John Himka &
BY Edwin R. Howell, Jr.
Paul Fitzpatrick
ATTORNEY

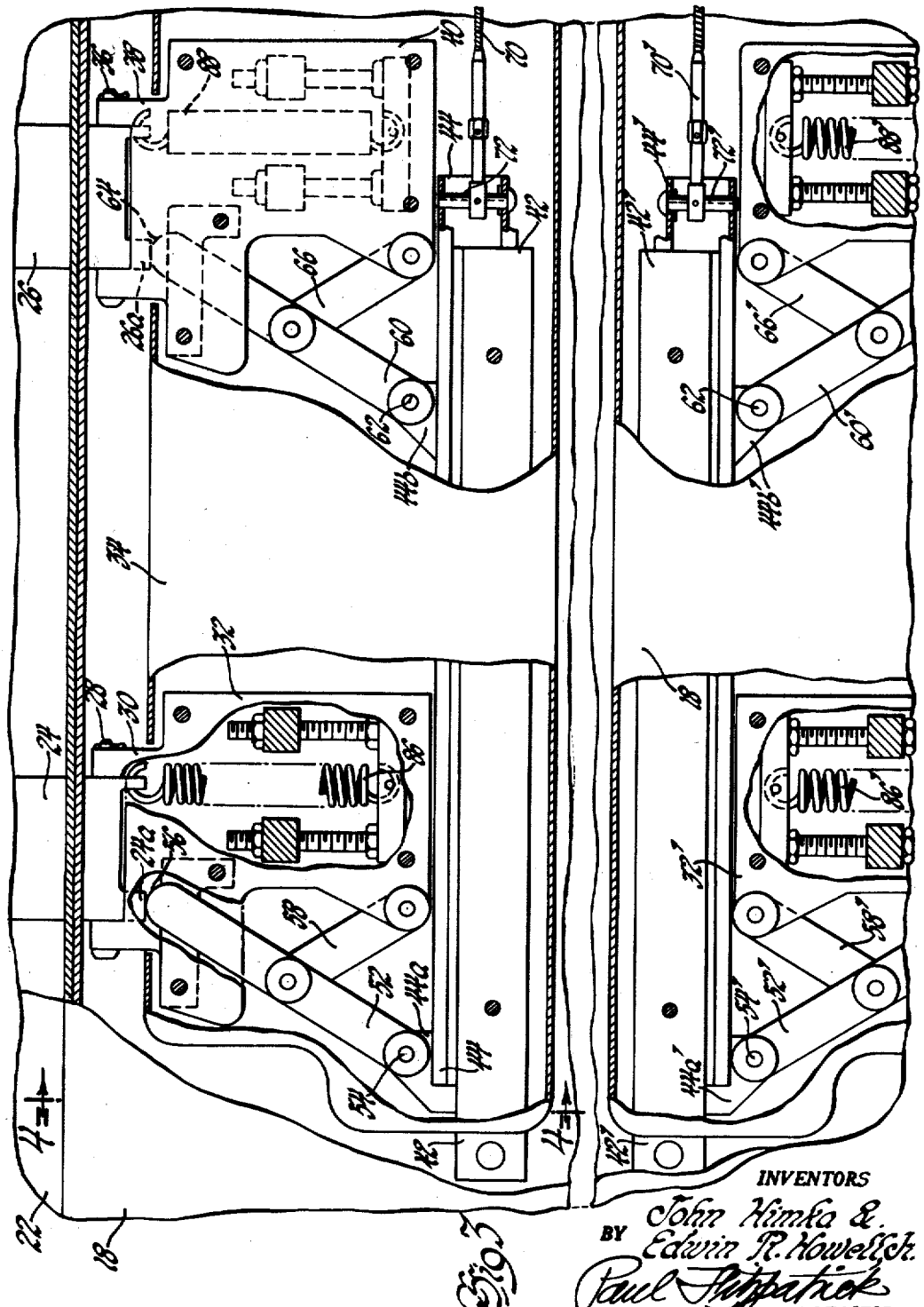

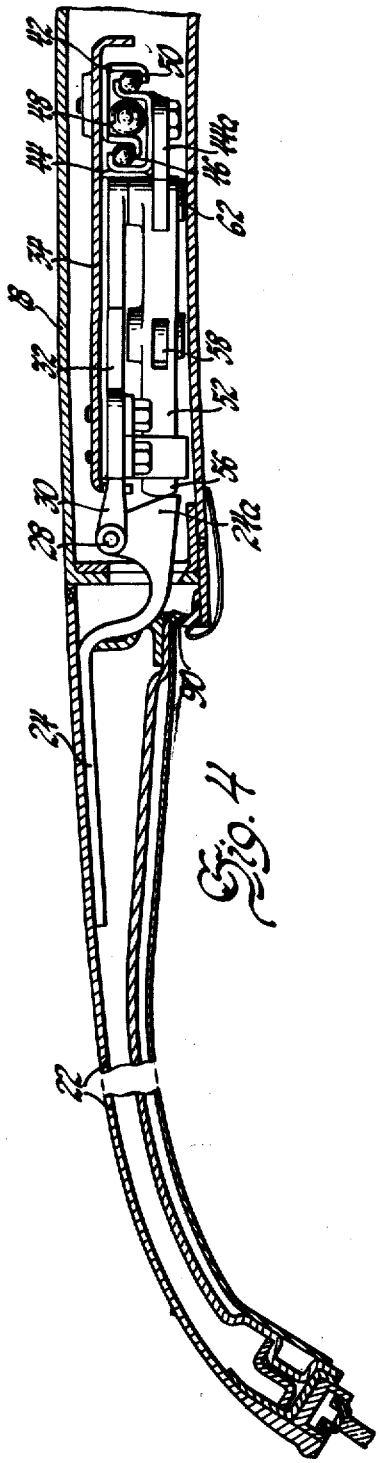

United States Patent Office 2,857,198
Patented Oct. 21, 1958

2,857,198

DOOR ACTUATED ROOF CLOSURE FOR VEHICLE SIDE DOOR OPENING

John Himka, Detroit, and Edwin R. Howell, Jr., Royal Oak, Mich., assignors to General Motors Corporation, Detroit, Mich., a corporation of Delaware Application January 18, 1956, Serial No. 559,872

6 Claims. (Cl. 296—44)

This invention relates to a movable closure for an automobile, and more particularly to a roof door contiguous with the side door opening in an automobile body.

One feature of the invention is that it provides an improved automobile roof door; another feature of the invention is that it provides a roof door which is opened and held open by means exerting a positive force, but which is closed by means exerting a yielding force to prevent injury to a passenger in the automobile; yet another feature of the invention is that door actuated, power operated control means are utilized to control the roof door as a function of opening movement of the conventional side door of the automobile; yet a further feature of the invention is that the positive operating means comprises a slide on the automobile body mounting cam links adapted to engage follower portions on the roof door hinges to provide a positive opening force in one direction only; still another feature of the invention is that the positive operating means includes guide links connected to the body and to the cam links for guiding movement of the cam links; and still a further feature of the invention is that the yielding closing means comprises at least one spring connected between the roof door and the body.

Other features and advantages of the invention will be apparent from the following description and from the drawings, in which:

Fig. 3 is an enlarged fragmentary top plan view, partly in section, of a portion of the automobile roof panel showing the operating means for the roof door;

Fig. 4 is a transverse vertical section taken along the line 4—4 of Fig. 3, the roof door being closed; and Fig. 5 is a section similar to a portion of Fig. 4 but with the roof door open.

Figures 1, 2:
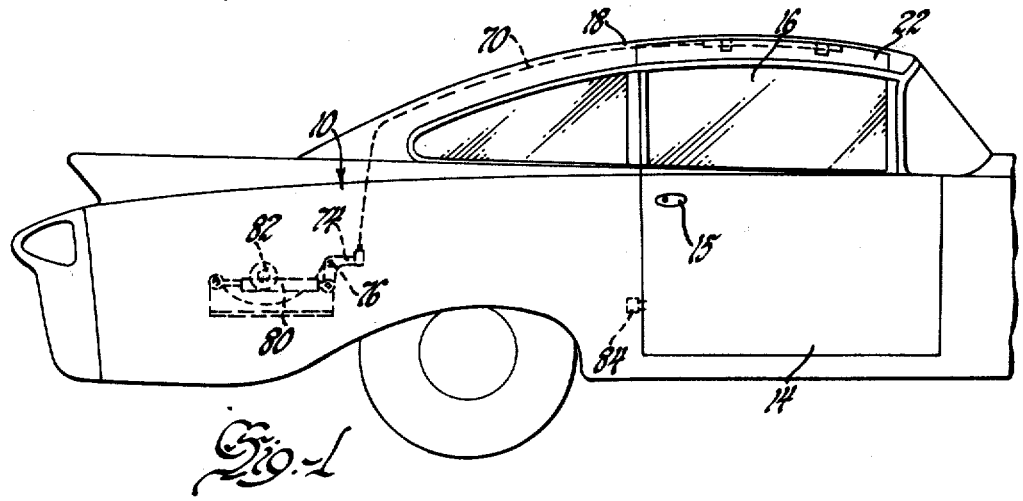
Fig. 1 is a fragmentary side elevation of an automobile incorporating the novel roof door, portions of the structure which underlie the automobile body panels being shown in broken lines and the side door and roof door being shown closed.
Fig. 2 is a rear perspective of the automobile of Fig. 1, showing the side door and the roof door open.

In many sport type automobiles the body of the car is so low that it is difficult for an adult to enter and leave the car through a conventional side door, and roof doors contiguous with the side door opening have been provided in some cars of this type. This invention provides an improved roof door which is power actuated as a function of opening movement of the conventional side door. The roof door is operated by novel means exerting a positive force for opening the roof door and holding it in open position and exerting a yielding force for closing the roof door. This impositive closing means prevents crushing the fingers of a passenger should he inadvertently put his hand in the roof door opening.

Referring now more particularly to the drawings, an automobile has a body designated generally as 10 having at each side a conventional opening 12 for a side door. Only the opening on the right side of the body is illustrated inasmuch as both sides of the automobile are similar. A door 14 is hingedly mounted on the body in the opening, the door having a retractable window 16 which, when in the closed position illustrated, completely closes the upper part 12a of the door opening 12. The door 14 is hingedly mounted at its front edge on the automobile body and the door may be latched in closed position by any conventional and well known latch device 13. In order to simplify the drawings, the latching arrangement and the handles 15 for controlling the door are illustrated only fragmentarily. These parts are conventional and are well understood in the art.

The automobile body has a roof panel 18 which has at opposite sides roof door openings 20 and 20'. Roof doors 22, 22' respectively are hingedly mounted on the body for swinging movement between the closed position illustrated in Figs. 1 and 4 and the open position illustrated in Figs. 2 and 5.

Figs. 3, 4 and 5 show the operating means for the roof doors. Inasmuch as the operating and control means for the roof door 22 is identical with the operating and control means for the roof door 22', only the means associated with the door 22 will be described. Corresponding parts for the roof door 22' are designated by a prime (') appended to the reference character. A pair of gooseneck hinge arms 24 and 26 are pivotally mounted on the body beneath the roof panel 18. The hinge arm 24 is pivotally connected by a pintle 28 to a stationary hinge member 30 which projects from a bracket 32. The bracket 32 is bolted to a body support bracket 34 as shown in Figs. 4 and 5. Similarly, the rear hinge arm 26 is pivoted on a pintle 36 extending through a stationary hinge member 38 projecting from a bracket 40 which is bolted to the body support bracket 34. The hinges may be swung through an arc of about 45 degrees to move the roof door 22 between its open and closed positions. As shown in Figs. 3, 4 and 5, each hinge arm has an inwardly projecting cam follower portion 24a and 26a, respectively.

The body support bracket 34 mounts a channel-shaped stationary track 42 which extends longitudinally of the automobile beneath the roof panel 18. A channel-shaped slide 44 rolls on the stationary track 42, antifriction means comprising balls 46, 48 and 50 being provided at a plurality of locations between the stationary track and the slide.

A cam link 52 is pivoted at one end at 54 on a bracket 44a depending from the slide 44. The other end of this link has a cam surface 56 which abuts the follower portion 24a of the gooseneck hinge arm 24. A guide link 58 is pivotally connected between an intermediate portion of the cam link 52 and the bracket 32.

The rear gooseneck hinge arm 26 is similarly actuated by a cam link 60 which is pivotally connected at one end at 62 to a bracket 44b projecting from the slide 44 and which, at its other end, has a cam surface 64 abutting the cam follower 26a. A guide link 66 connects an intermediate portion of the rear cam link 60 with the bracket 40.

Power operated control means are provided for moving the slide 44 between a retracted position as shown in Fig. 3 wherein the roof door is closed and an extended position wherein the roof door is open as shown in Figs. 2 and 5. This actuating means comprises a flexible cable 70, one end of which is connected by a pin 72 to the slide 44 and which extends beneath the roof panel to a location behind the automobile seats, being connected at its rear end to a bell crank 74 pivoted at 76 on a stationary bracket 78. The other arm of the bell crank is connected to a screw jack operator 80 which is driven by a reversible electric motor 82. The motor may be controlled by a conventional door jamb switch 84 so that the motor is operated whenever the door is opened. A conventional and well known type circuit including reversing limit switches may be utilized to reverse the motor when the door is closed. A suitable circuit is shown in the copending application of William H. Daniels, entitled Control Means for a Vehicle Seat and Closure and filed January 18, 1956 as Serial No. 559,868, now Patent No. 2,809,862.

Assuming the parts to be in the position of Figs. 3 and 4, when the door is opened, the power operated control means is actuated to pull on the cable 70 and extend the slide 44 rearwardly along the stationary track 42. This action swings the links 52 and 60 to the right as the parts appear in Fig. 3. Since the guide links 58, 66 hold an intermediate portion of the cam links 52, 60, stationary the resultant force at the camming ends of these cam links is outwardly, swinging the roof door 22 to the open position of Fig. 5 with a positive mechanical force. When the door 14 is shut to cause reverse operation of the actuating motor 82, the slide 44 will be retracted toward the left back to the position of Fig. 3. However, there is only a one-way positive connection between the camming links and the gooseneck roof door hinges. A yielding force to close the roof door 22 is provided by springs 86 and 88 which are connected between the hinge arms and the automobile body. If a passenger in the automobile inadvertently places his hand in the roof door opening, the hand or fingers will not be crushed because the spring will yield. The roof door opening is surrounded by a weather strip 90 as shown in Figs. 4 and 5, which will also yield to prevent injury to the passenger's hand. Obviously, the positive force exerted by the slide and cam links is of sufficient magnitude to overcome the combined force of the two springs 86, 88 and the gravity of the door.

While we have shown and described one embodiment of our invention, it is capable of many modifications. Changes, therefore, in the construction and arrangement may be made without departing from the spirit and scope of the invention as set forth in the appended claims.

We claim:

1. Closure apparatus of the character described, including: an automobile body with a roof panel having an opening for a roof door along a side thereof; a closure member; means mounting said closure member on the body for swinging movement between a closed position covering said roof door opening and an open position permitting access into said body through said roof door opening, said hinge means including a pivoted arm connected to the closure member and having a cam follower portion; first operating means adapted to exert positive force for opening said closure member and holding it in open position comprising a slide on the body, a cam link pivoted at one end on the slide and having a cam at its other end adapted to engage the cam follower portion of one of said hinge arms to open the door when the slide is extended, and a guide link pivotally connecting an intermediate portion of said cam link to the automobile body; control means connected to said slide for moving the slide between extended and retracted positions; and second operating means comprising a spring connected between said hinge arm and said automobile body and exerting a yielding force to close said closure member upon retraction of said first operating means, the positive force exerted by the first operating means being of sufficient magnitude to overcome the force of the second operating means to open the closure member and hold it in open position.

2. A roof door for an automobile comprising in combination: an automobile body having a side door opening with a door swingably mounted therein, and a roof panel having an opening for a roof door along a side thereof contiguous with said side door opening; a closure member; hinge means mounting said closure member on the body for swinging movement between a closed position covering said roof door opening and an open position permitting access into said body through said roof door opening, said hinge means including a pivoted arm connected to the closure member and having a cam follower portion; first operating means adapted to exert positive force for opening said closure member and holding it in open position comprising a cam link adapted to engage the cam follower portion of said hinge arm to open the door; control means connected to said first operating means for moving said link between extended and retracted positions; and second operating means comprising a spring connected between said hinge arm and said automobile body and exerting a yielding force to close said closure member upon retraction of said first operating means, the positive force exerted by the first operating means being of sufficient magnitude to overcome the force of the second operating means to open the closure member and hold it in open position.

3. A roof door for an automobile comprising in combination: an automobile body having a roof panel with an opening for a roof door along a side thereof; a closure member; at least one hinge mounting said closure member on the body for swinging movement between a closed position covering said roof door opening and an open position permitting access into said body through said roof door opening, said hinge including a pivoted arm connected to the closure member and having a cam follower portion; first operating means adapted to exert positive force for opening said closure member and holding it in open position comprising a slide on the body; a cam link pivoted at one end on the slide and having a cam at its other end adapted to engage the cam follower portion of the hinge arm to open the door when the slide is extended, and a guide link pivotally connecting an intermediate portion of said cam link to the automobile body; control means connected to said slide for moving the slide between extended and retracted positions; and second operating means comprising a spring connected between said hinge arm and said automobile body and exerting a yielding force to close said closure member upon retraction of said first operating means, the positive force exerted by the first operating means being of sufficient magnitude to overcome the force of the second operating means to open the closure member and hold it in open position.

4. A roof door for an automobile comprising in combination: an automobile body having a side door opening with a door swingably mounted therein, and a roof panel having an opening for a roof door along a side thereof contiguous with said side door opening; a closure member; at least one hinge mounting said closure member on the body for swinging movement between a closed position covering said roof door opening and an open position permitting access into said body through said roof door opening, said hinge including a pivoted arm connected to the closure member and having a cam follower portion; first operating means adapted to exert positive force for opening said closure member and holding it in open position comprising a slide on the body, a cam link pivoted at one end on the slide and having a cam at its other end adapted to engage the cam follower portion of the hinge arm to open the door when the slide is extended, and a guide link pivotally connecting an intermediate portion of said cam link to the automobile body; power operated control means connected to said slide for moving the slide between extended and retracted positions; and second operating means comprising a spring connected between said hinge arm and said automobile body and exerting a yielding force to close said closure member upon retraction of said first operating means, the positive force exerted by the first operating means being of sufficient magnitude to overcome the force of the second operating means to open the closure member and hold it in open position.

5. A roof door for an automobile comprising in combination: an automobile body having a side door opening with a door swingably mounted therein, and a roof panel having an opening for a roof door along a side thereof contiguous with said side door opening; a closure member; a pair of hinges mounting said closure member on the body for swinging movement between a closed position covering said roof door opening and an open position permitting access into said body through said roof door opening, each hinge including a pivoted arm connected to the closure member and having a cam follower portion; first operating means adapted to exert positive force for opening said closure member and holding it in open position comprising a slide on the body, a pair of cam links, each being pivoted at one end on the slide and each link having a cam at its other end adapted to engage the cam follower portion of one of the hinge arms to open the door when the slide is extended, and guide links pivotally connecting an intermediate portion of each cam link to the automobile body; power operated control means connected to said slide for moving the slide between extended and retracted positions; and second operating means comprising a spring connected between each hinge arm and said automobile body and exerting a yielding force to close said closure member upon retraction of said first operating means, the positive force exerted by the first operating means being of sufficient magnitude to overcome the force of the second operating means to open the closure member and hold it in open position.

6. A roof door for an automobile comprising in combination: an automobile body having a side door opening with a door swingably mounted therein, and a roof panel having an opening for a roof door along a side thereof contiguous with said side door opening; a closure member; a pair of hinges mounting said closure member on the body for swinging movement between a closed position covering said roof door opening and an open position permitting access into said body through said roof door opening, each hinge including a pivoted arm connected to the closure member and having a cam follower portion; first operating means adapted to exert positive force for opening said closure member and holding it in open position comprising a slide on the body, a pair of cam links, each being pivoted at one end on the slide and each link having a cam at its other end adapted to engage the cam follower portion of one of the hinge arms to open the door when the slide is extended, and guide links pivotally connecting an intermediate portion of each cam link to the automobile body; power operated control means connected to said slide for moving the slide between extended and retracted positions; door actuated means for operating said control means; and second operating means comprising a spring connected between each hinge arm and said automobile body and exerting a yielding force to close said closure member upon retraction of said first operating means, the positive force exerted by the first operating means being of sufficient magnitude to overcome the force of the second operating means to open the closure member and hold it in open position.

References Cited in the file of this patent

UNITED STATES PATENTS

| 2,647,790 | Blackman | Aug. 4, 1953 |

FOREIGN PATENTS

| 426,994 | Great Britain | Apr. 12, 1935 |
| 458,873 | Italy | Aug. 4, 1950 |

OTHER REFERENCES

Periodical: "The Autocar," Dec. 17, 1937, page 1198 only, article: "A non-stoop roof."

UNITED STATES PATENT OFFICE
CERTIFICATE OF CORRECTION

Patent No. 2,857,198                                October 21, 1958

John Himka et al.

It is hereby certified that error appears in the printed specification of the above numbered patent requiring correction and that the said Letters Patent should read as corrected below.

Column 1, line 30, after "body" insert -- pivotally --.

Signed and sealed this 2nd day of June 1959.

(SEAL)
Attest:

KARL H. AXLINE
Attesting Officer

ROBERT C. WATSON
Commissioner of Patents

UNITED STATES PATENT OFFICE
CERTIFICATE OF CORRECTION

Patent No. 2,857,198                                                             October 21, 1958

John Himka et al.

It is hereby certified that error appears in the printed specification of the above numbered patent requiring correction and that the said Letters Patent should read as corrected below.

Column 1, line 30, after "body" insert -- pivotally --.

Signed and sealed this 2nd day of June 1959.

(SEAL)
Attest:

KARL H. AXLINE
Attesting Officer

ROBERT C. WATSON
                                                   Commissioner of Patents